United States Patent
Adams et al.

(10) Patent No.: US 11,122,080 B2
(45) Date of Patent: Sep. 14, 2021

(54) METHOD AND SYSTEM FOR IDENTIFYING A PREFERRED SET OF HIERARCHICALLY STRUCTURED ITEMS IN STREAMING DATA

(71) Applicant: Arbor Networks, Inc., Burlington, MA (US)

(72) Inventors: Andrew Lee Adams, Burlington, MA (US); Cameron Hanover, Burlington, MA (US); Dagan Harrington, Burlington, MA (US); Jiasi Li, Burlington, MA (US); Joachim Wright, Burlington, MA (US)

(73) Assignee: Arbor Networks, Inc., Westford, MA (US)

(*) Notice: Subject to any disclaimer, the term of this patent is extended or adjusted under 35 U.S.C. 154(b) by 0 days.

(21) Appl. No.: 16/564,740

(22) Filed: Sep. 9, 2019

(65) Prior Publication Data

US 2020/0092327 A1    Mar. 19, 2020

Related U.S. Application Data

(60) Provisional application No. 62/728,550, filed on Sep. 7, 2018.

(51) Int. Cl.
*H04L 29/06* (2006.01)
*G06K 9/62* (2006.01)

(52) U.S. Cl.
CPC ........ *H04L 63/1491* (2013.01); *G06K 9/6231* (2013.01); *H04L 63/1458* (2013.01)

(58) Field of Classification Search
None
See application file for complete search history.

(56) References Cited

U.S. PATENT DOCUMENTS 7,437,385 B1* 10/2008 Duffield ............. H04L 63/1425
8,751,645 B2* 6/2014 Mounaouar ............. H04L 43/00
                                                          709/224

(Continued)

OTHER PUBLICATIONS

Michael Mitzenmacher, Thomas Steinke, Justin Thaler; "Hierarchical Heavy Hitters with the Space Saving Algorithm";Aug. 9, 2011; "School of Engineering and Applied Sciences"; pp. 1-18 (Year: 2011).*

*Primary Examiner* — Dant B Shaifer Harriman
*Assistant Examiner* — Arezoo Sherkat
(74) *Attorney, Agent, or Firm* — Locke Lord LLP; Scott D. Wofsy; Christopher J. Capelli

(57) ABSTRACT

A computer implemented method and system for identifying a preferred set of hierarchically structured items in streaming data for analyzing Netflow data to identify those network destinations that are currently the target of a DDoS attack and to automatically select a set of network prefixes such that diversion routes for the prefixes are sent to the routers to divert attack traffic to TMS devices, The method includes searching sets of Hierarchical Heavy Hitters wherein each set corresponds to a different fraction of a total volume of network traffic and scoring each set according to an arbitrary scoring function. A certain set is selected and scored with a 'good' score and a member of the 'good' scored set is ranked in accordance with an arbitrary ranking function. A subset of the 'good' scored set is selected such that the volume associated with the subset is in close proximity to a user-specified total whereby the selected subset becomes a set of recommended prefixes.

4 Claims, 2 Drawing Sheets

(56) References Cited

U.S. PATENT DOCUMENTS

| | | | |
|---|---|---|---|
| 9,674,207 B2 * | 6/2017 | Di Pietro | H04L 63/1458 |
| 2010/0082811 A1 * | 4/2010 | Van Der Merwe | G06F 16/9535 |
| | | | 709/225 |
| 2015/0058976 A1 * | 2/2015 | Carney | H04L 63/1408 |
| | | | 726/22 |
| 2016/0021141 A1 * | 1/2016 | Liu | H04L 63/1433 |
| | | | 726/23 |

* cited by examiner

METHOD AND SYSTEM FOR IDENTIFYING A PREFERRED SET OF HIERARCHICALLY STRUCTURED ITEMS IN STREAMING DATA

FIELD OF THE INVENTION

The present invention relates generally to computer networks, and more specifically to methods and systems for identifying a preferred set of hierarchically structured items in streaming data.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

The growing problems associated with security exploits within the architecture of the Internet are of significant concern to network providers. Networks, and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a host from normal processing; traffic reflected and/or amplified through legitimate hosts; traffic originating from compromised sources or from spoofed IP addresses; and pulsed attacks (which start/stop attacks). Further, it is to be understood DDoS attacks are typically categorized as: TCP Stack Flood Attacks (e.g., flood a certain aspect of a TCP connection process to keep the host from being able to respond to legitimate connections (which may also be spoofed)); Generic Flood Attacks (e.g., consists of a flood of traffic for one or more protocols or ports, which may be designed to appear like normal traffic which may also be spoofed)); Fragmentation Attacks (e.g., consists of a flood of TCP or UDP fragments sent to a victim to overwhelm the victim's ability to re-assemble data streams, thus severely reducing performance); Application Attacks (e.g., attacks designed to overwhelm components of specific applications); Connection Attacks (e.g., attacks that maintain a large number of either ½ open TCP connections or fully open idle connections); and Vulnerability Exploit Attacks (e.g., attacks designed to exploit a vulnerability in a victim's operating system).

The architecture of the Internet makes networks and network devices vulnerable to the growing problems of DDoS attacks. Therefore, the ability to avoid or mitigate the damages of a DDoS attack is advantageous to devices located in a protected network.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, it is to be understood and appreciated, "H3PREF" as referenced herein relates to Hierarchical Heavy Hitter algorithms that provides SP a method for analyzing Netflow data in real time to identify those network destinations that are currently the target of a DDoS attack, and to automatically select a set of network prefixes, subject to preference constraints, so that diversion routes for these prefixes can be sent to the appropriate routers in order to divert the attack traffic to TMS devices. Preferably, SP Collector devices execute an instance of H3PREF and preferably periodically send their results to a Leader device. The Leader device also preferably executes an instance of H3PREF which may be queried to determine the best set of routes to announce so as to divert attack traffic.

It is to be appreciated that algorithms are known that identify a set of so-called Hierarchical Heavy Hitters in a data stream, none have been able to to identify a set of generalized IDs wherein each ID contributes more than some specified fraction of the total volume. In one aspect of an embodiment of the present invention, and as described herein, H3PREF is configured and operative to search over sets of Hierarchical Heavy Hitters, each set preferably corresponding to a different fraction of the total volume. Sets are preferably scored according to an arbitrary scoring function and the set with a 'good' score is selected. The members of this set are then ranked according to an arbitrary ranking function and a subset of this set is selected such that the volume associated with the subset is close to a user-specified total. This subset becomes the set of 'recommended prefixes'.

Accordingly, the illustrated embodiments of the present invention provide a solution that results in the identification and selection of generalized IDs (e.g. network prefixes) subject to certain constraints.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
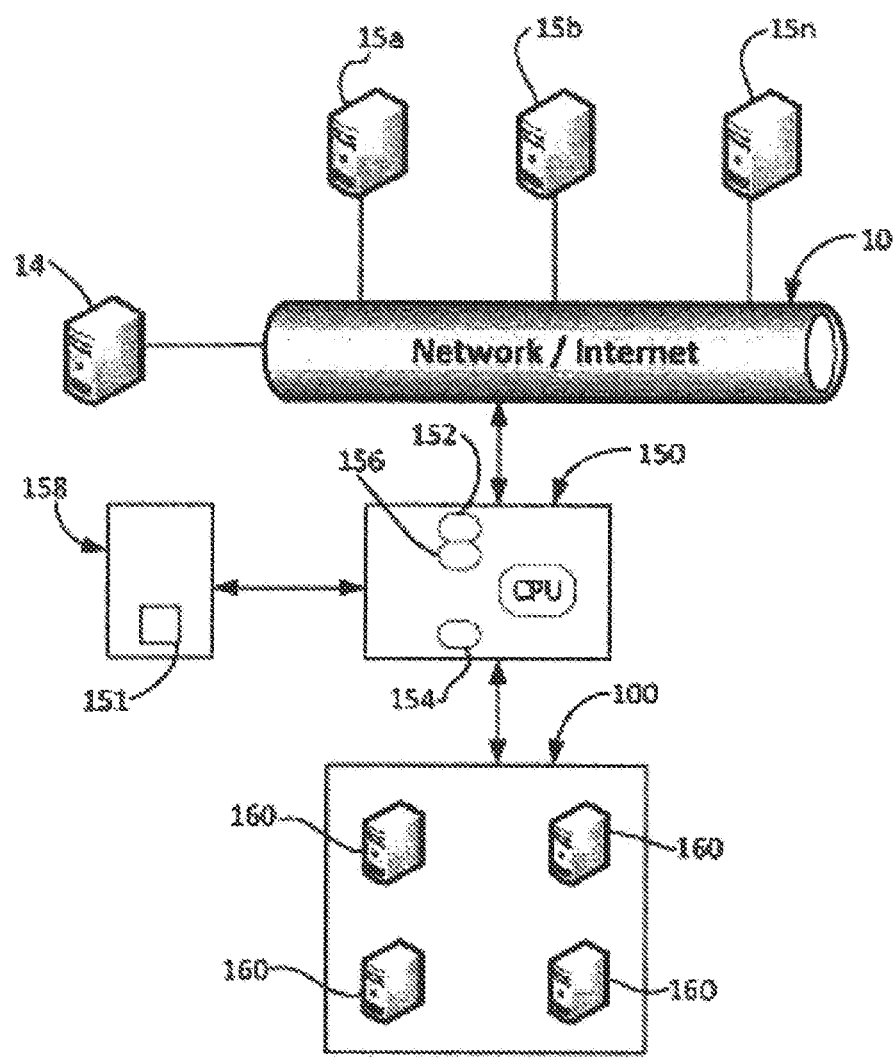
FIG. 1 illustrates an example communication network which may encompass an embodiment of the present invention.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

It is to be further understood the illustrated embodiments of the present invention describe a system, apparatus and method for avoiding and mitigating the harmful effects of a Distributed Denial of Service ("DDoS") attack on a computer system/device or network. An ordinary denial of service attack, or DoS attack, may be defined as an attack by an offensive external device on a network device such as network routers, Internet servers, electronic mail servers, Domain Name System servers, etc. Such an attack may cause a loss of service to the network users due to a consumption of network bandwidth or an overload of system resources. The DDoS attack is an enhanced DoS attack in which multiple offensive devices coordinate a simultaneous attack upon a single targeted network device.

Turning now descriptively to the drawings, in which similar reference characters denote similar elements throughout the several views, FIG. 1 illustrates the relationship between the protected network 100, protection system 150, Internet 10, and external host devices 15 *a*, 15 *b* . . . 15 *n*. It is to be appreciated that protected network 100 preferably includes a plurality of servers 160 preferably consisting of a plurality of server types, including, but not limited to: Generic; Web; DNS; Mail; VOiP; VPN; RLogin; and File Servers.

In a typical implementation, the external host devices 15 *a*, 15 *b* . . . 15 *n* (also referred to as external devices or host devices) attempt to connect to protected devices 160 within a protected network 100 typically via a private network or a public computer network such as the Internet 10. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 10 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network, traffic is diverted to the protection system 150.

The protection system 150 preferably includes a packet processing system preferably having an external high speed network interface 152 and a protected high-speed network interface 154. Typically, these interfaces are capable of handling 1.5-40 Gbps, for example. System 150 may further include processors 156 that preferably process the packets received at interfaces 152 and 154. Additionally, a central processing unit (CPU), random access memory (RAM), and a storage medium 158 are preferably connected through buses and are used to further support the processing of the received packets. Computer code is preferably stored in the storage medium and executed by the CPU. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 also preferably stores the host tables 151 used in the below described authenticated process of external device hosts 15 a, 15 b . . . 15 n as well as other possible information such as predefined filter rules.

In a typical implementation, the protection system 150 authenticates all external host devices 15 a, 15 b . . . 15 n before allowing the external devices to access the protected devices 160 within the protected network 100.

During an attack, the protection system 150 seeks to distinguish between attack traffic 14 and traffic made by legitimate host devices 15a, 15b . . . 15n by analyzing traffic to determine traffic (packet) classifications which are subsequently used to determine countermeasures (preferably of varying severity to mitigate attack), which are to be applied to received packets in the traffic, prior to accessing the protected devices 160 within the protected network 100. Thus, a goal of the protection system 150 is to selectively apply/modify one or more countermeasures to a determined traffic class/category to prevent traffic 14 from malicious devices from accessing the protected network 100.

It is to be appreciated above reference and description of system 150 of FIG. 1 is provided for illustrative purposes only as to an exemplary network system that may encompass the below described present invention embodiments, and is not to be restricted in any way to what is shown and described in FIG. 1.

Figure 2:
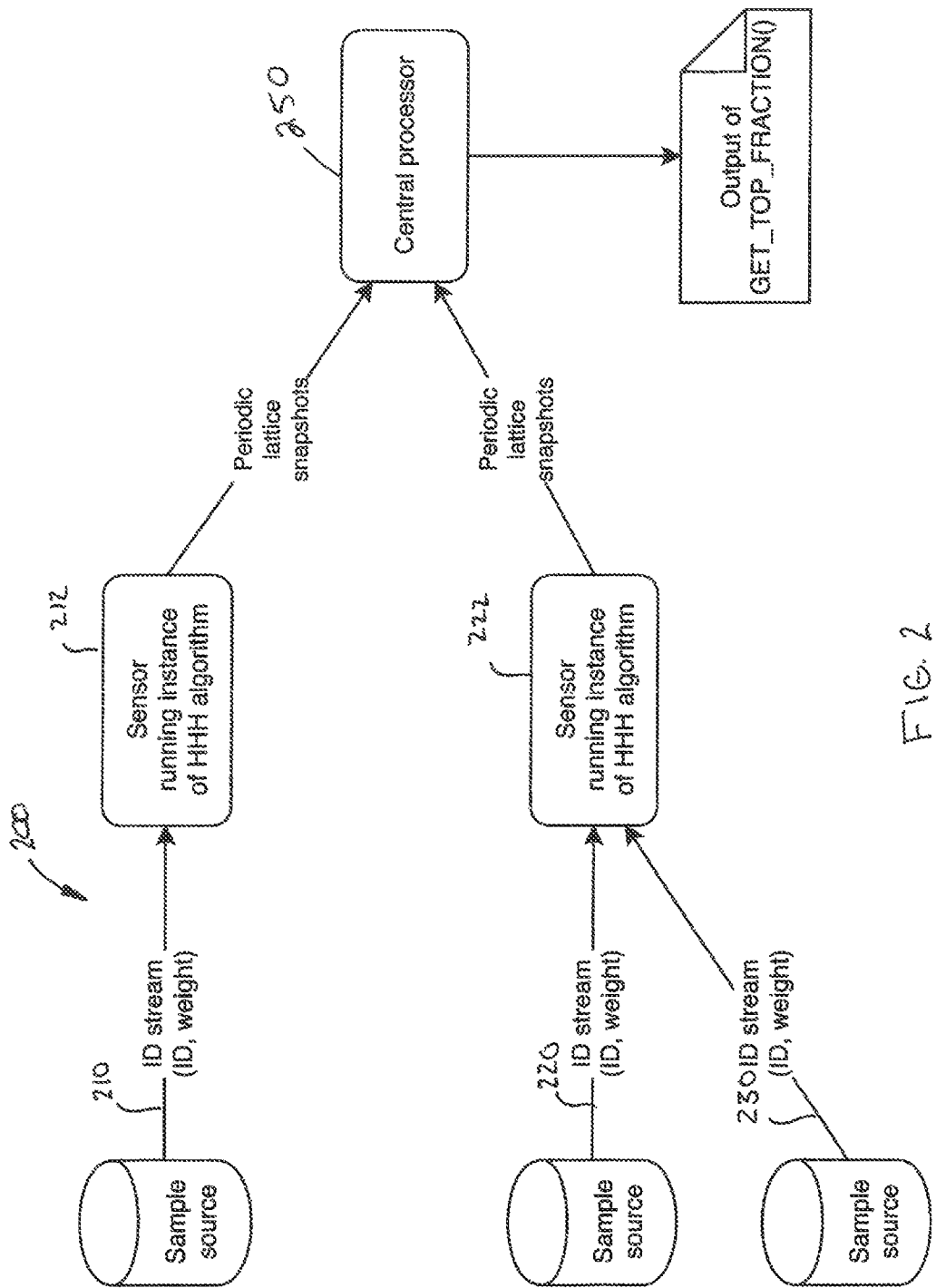
FIG. 2 illustrates as system level diagram depicting an illustrated embodiment of the present invention.

It is to be further appreciated, as described herein, H3PREF is to be understood as a streaming algorithm for identifying a preferred set of hierarchically-structured IDs present in a weighted data stream observed in a network (hereafter, 'weighted data stream' is referred to as 'data stream' or 'stream'). With reference now to FIG. 2, the stream 200 is preferably aggregated from multiple sub-streams (210, 220, 230), each sub-stream processed by a different sensor (212, 222) in the network (10). In accordance with an illustrative embodiment, a stream (210, 220, 230) is considered to be a sequence of (ID, weight) pairs. The weight associated with an ID is accumulated in an ID-specific counter and the accumulated weight is referred to as the 'volume' associated with the ID. In order to impose a bounds on the memory consumed by the counters associated with each stream, the number of counters is preferably capped at a number that is potentially less than the number of unique IDs. Due to this constraint, a certain amount of error is associated with the volume maintained in each counter and the counters are said to 'estimate' the volume associated with each ID.

Preferably the volume estimates accumulated for the data streams from each network sensor are aggregated and merged together in order to provide a global view of the network. The universe of IDs is preferably assumed to be hierarchically structured whereby the IDs appearing in the stream can be generalized into less-specific groups, where each group member is now identified by the new, generalized ID. This generalization process is preferably repeated, creating additional generalized groups. An example of such a universe of IDs is IPv4 host addresses and the set of ever-less-specific subnets to which they can be generalized. For a set of more specific IDs that generalize to the same generalized ID, the volume estimates associated with the more specific IDs are merged, preferably subject to constraints, into a counter associated with the generalized ID.

In discussing the illustrated embodiments of the present invention, it is to be appreciated that a known challenge is selection from amongst the members of the groups at each level of generalization, a set of IDs subject to the following constraints:
(1) The estimated volume summed over the set of IDs comes in proximity to a specified fraction of the total stream volume.
(2) Each selected ID is seen to contribute a significant amount to the total volume.
The properties of the set of IDs make it preferred over other sets whose members are also seen to satisfy (1) and (2).

As mentioned above, it is to be understood and appreciated, "H3PREF" as referenced herein relates to Hierarchical Heavy Hitter algorithms that provides SP a method for analyzing Netflow data in real time to identify those network destinations that are currently the target of a DDoS attack, and to automatically select a set of network prefixes, subject to preference constraints, so that diversion routes for these prefixes can be sent to the appropriate routers in order to divert the attack traffic to TMS devices. Preferably, SP Collector devices execute an instance of H3PREF and preferably periodically send their results to a Leader device. The Leader device also preferably executes an instance of H3PREF which may be queried to determine the best set of routes to announce so as to divert attack traffic.

It is to be appreciated that algorithms are known that identify a set of so-called Hierarchical Heavy Hitters in a data stream, none have been able to to identify a set of generalized IDs wherein each ID contributes more than some specified fraction of the total volume. In one aspect of an embodiment of the present invention, and as described herein, H3PREF is configured and operative to search over sets of Hierarchical Heavy Hitters, each set preferably corresponding to a different fraction of the total volume. Sets are preferably scored according to an arbitrary scoring function and the set with a 'good' score is selected. The members of this set are then ranked according to an arbitrary ranking function and a subset of this set is selected such that the volume associated with the subset is close to a user-specified total. This subset becomes the set of 'recommended prefixes'.

In accordance with the illustrated embodiments of the present invention, provided is a method that enables identification, in real time, the largest components of aggregate attack traffic, while automatically generating routing announcements to mitigate the attack traffic. It is to be appreciated that it is of particular value in 'carpet bombing attacks' scenarios, wherein the attack traffic to each of several individual hosts on a network falls below pre-configured 'misuse traffic thresholds', but the aggregated traffic is intended to overwhelm the network. It is thus to be further appreciated that providing the ability to aggregate traffic destined for different hosts, determine if the aggregate represents a significant fraction of the total and if so, recommend it as a subnet for which traffic should be diverted, simplifies the work flow for SP Users, allowing them to respond to attacks in shorter time, and requiring fewer traffic analysis skills.

It is to be understood that H3PREF is not limited to streams where IDs are host network addresses. It can be used in any situation where IDs, however constructed, can be generalized. For example, IDs could be constructed by concatenating the source and destination addresses seen in Netflow data. These composite IDs can be straightforwardly generalized.

In accordance with the following description of H3PREF, it is to be understood it utilizes IPv4 host and subnet addresses as IDs and assumes that the weighted data stream is comprised of Netflow records.

For instance, it is to be understood that H3PREF has four facets.
1. A lattice structure that models the hierarchy inherent in the ID space
2. A counter update procedure
3. A stream merging procedure
4. A selection process for identifying a set of IDs representative of a user-specific fraction of the total volume. This selection process is referred to as GET_TOP_FRACTION.

The lattice structure, counter update procedure, and stream merging procedure mimic the structure described in "Hierarchical Heavy Hitters with the Space Saving Algorithm", by Mizenmacher et al, 2011. In this example, a lattice with three levels is defined. The deepest level, the /32 level, is also the most specific level. This level implements counters tracking the volume associated with IPv4 host addresses. Above that level is the less-specific /28 level. Counters at this level track the volume associated with /28-subnets to which host addresses in the /32 level generalize. Finally, the top level of the lattice is the /24 level at which there are counters to track the volume associated with the /24-subnets to which the /28-subnets generalize. Note that the specification of three lattice levels is arbitrary; the choice of the number of lattice levels depends on concerns about memory consumption and update time.

Preferably, the maximum number of counters at each level is fixed and the lattice structure exists at each network sensor. A given network sensor preferably processes a Netflow record and from it constructs a (IPv4 host address, packet-length) pair. It allocates and/or updates a counter for the host address residing in the /32 level of the lattice, per the Space Saving Algorithm, as described in Mizemacher et al. It then generalizes this address to a /28 subnet and allocates and/or updates a counter for this subnet at the /28 level of the lattice, again per the Space Saving Algorithm. Finally, the /28 subnet is generalized to a /24 subnet and the process is repeated for the /24 level of the lattice. At a predefined frequency, the state of each lattice at each sensor is preferably sent to a central processor 250. The processor 250 merges the state of each lattice into another similarly-structured lattice. It is on this central processor 150 that GET_TOP_FRACTION 260 is preferably executed. The GET_TOP_FRACTION 260 takes as an input parameter a fraction, "F" wherein "F" is a fraction of the total, aggregated stream volume. The GET_TOP_FRACTION 260 identifies a set of set of host addresses and network prefixes whose total volume is reasonably close "F".

The GET_TOP_FRACTION 260 operates by computing successive solutions to the Hierarchical Heavy Hitter problem (HHH problem) as described in Mitzenmacher et al. A solution to the HHH problem is a set of IPv4 host addresses and subnet prefixes such that the volume associated with each member of the set contributes at least a fraction T of the total volume. This set is referred to as an 'HHH set'. Note that T and F are different. The sum of the volume contributed by each set member could easy be greater than F times the total volume.

It is to be understood that computing solutions to the HHH problem using different values of T results in potentially different HHH sets. GET_TOP_FRACTION 260 computes 'candidate' HHH sets for several values of T. It first estimates the value T associated with the smallest contributor to the overall volume. This value is herein referred to as "Tmin". It then preferably divides the range from Tmin to 100 into a fixed number of steps, D. GET_TOP_FRACTION 260 computes HHH sets for each step in this range. A scoring function is then preferably used to assign a score to each HHH set. This function takes into account arbitrary characteristics of the set such as the mix of network mask lengths present in the set and the number of members in the set. Larger scores correspond to more preferred sets. With reference to below Table 1, illustrated is an illustrated embodiment for the Pseudo-Code for the GET_TOP_FRACTION 260 wherein the lattice is the lattice formed by aggregating the streams processed by each sensor, such that F is the target fraction. As illustrated in below Table 1, a set of stream elements are identified that are Hierarchical Heavy Hitters but whose summed contributions to the total stream volume comes reasonably close to F without exceeding it.

TABLE 1

```
GET_TOP_FRACTION(lattice, F)
    best_set := □        # Initialize to the empty set. Our best solution sofar.
    best_score := 0.0    # the 'score' of best_set
    # Divide HHH algorithm's 'threshold range' into D steps. D is aconstant.
    # t_min is the smallest fraction of the total stream volume contributedby
    # any lattice element in F.
    t_min := smallest_contribution(lattice)
    step_size := (1.0 − t_min) / D
    # Compute and score Hierarchical Heavy Hitter sets for select values ofphi
    for(s = 0; s < D; s := s + 1) {
        phi := t_min + ( s * step_size)
        # compute a set of Hierarchical Heavy Hitters with threshold phi
        # compute_hhhset( ) returns a set of (ID, volume) pairs drawn fromlattice,
        # each of which was seen to contribute at least fraction 'phi'of total
        volume.
        candidate_set := compute_hhhset(lattice, phi)
        # sort the elements of candidate_set via a domain-specific sorting
        function.
        # E.g. if IDs are network prefixes, then prefixes with longernetmasks
        might be
        # ordered before those with shorter netmasks.
        ordered_set := sort(candidate_set)
        candidate_set := □ # initialize to the empty set
        sum_contrib := 0.0
        for each element e of ordered_set {
            # contribution( ) gets e's fractional contribution to the totalvolume
            if (sum_contrib + contribution(e) < F) {
```

TABLE 1-continued

```
            sum_contrib := sub_contrib + contribution(e)
            candidate_set := candidate_set UNION e # Add e tocandidate_set
        }
    }
    # score( ) is a domain-specific function returning a number indicatingour
    # preference of candidate_set. Larger numbers indicate morepreference.
    E.g. if
    # IDs are network prefixes, score( ) might rank sets according tothe
    frequency
    # of netmask lengths represented in the set.
    candidate_score := score(candidate_set)
    if (candidate_score > best_score) {
        best_set := candidate_set
        best_score := candidate_score
    }
# best_set contains IDs for which the sum of their fractionalcontributions
# to total volume is reasonably close to, but does not exceed, F.
return best_set
```

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method for identifying a preferred set of hierarchically structured items in streaming data for analyzing network data traffic (Netflow data) to identify those network destinations that are currently the target of a Distributed Denial of Service (DDoS) attack and to automatically select a set of network prefixes such that diversion routes for the prefixes are sent to routers to divert attack traffic to Threat Mitigation Systems (TMS) devices, comprising:
    searching sets of Hierarchical Heavy Hitters (H3PREF) wherein each set corresponds to a different fraction of a total volume of network traffic and includes at least:
        1) a lattice structure modeling hierarchy in an ID space;
        2) a counter update procedure; and 3) a stream merging procedure;
    scoring each set according to an arbitrary scoring function that includes a mix of network mask lengths present in the set and a number of members in the set;
    selecting a good scored set with a value indicative that a network device is not associated with a DDoS attack;
    ranking member of the good scored set in accordance with an arbitrary ranking function; and
    selecting a subset of the good scored set such that a volume associated with the subset is in close proximity to a user-specified total whereby the selected subset becomes a set of recommended prefixes.

2. A computer system for identifying a preferred set of hierarchically structured items in streaming data for analyzing network data traffic (Netflow data) to identify those network destinations that are currently the target of a Distributed Denial of Service (DDoS) attack and to automatically select a set of network prefixes such that diversion routes for the prefixes are sent to routers to divert attack traffic to Threat Mitigation Systems (TMS) devices, comprising:
    a memory configured to store instructions;
    a processor disposed in communication with said memory, wherein said processor upon execution of the instructions is configured to:
    search sets of Hierarchical Heavy Hitters (H3PREF) wherein each set corresponds to a different fraction of a total volume of network traffic and includes at least:
        1) a lattice structure modeling hierarchy in an ID space;
        2) a counter update procedure; and 3) a stream merging procedure;
    score each set according to an arbitrary scoring function that includes a mix of network mask lengths present in the set and a number of members in the set;
    select a good scored set scored with a value indicative that a network device is not associated with a DDoS attack;
    rank member of the good scored set in accordance with an arbitrary ranking function; and
    select a subset of the good scored set such that a volume associated with the subset is in close proximity to a user-specified total whereby the selected subset becomes a set of recommended prefixes.

3. The computer method as recited in claim 1, wherein each H3PREF further includes a selection process for identifying a set of IDs representative of a user-specific fraction of a total volume of the streaming data.

4. The computer system as recited in claim 2, wherein each H3PREF further includes a selection process for identifying a set of IDs representative of a user-specific fraction of a total volume of the streaming data.

* * * * *